(12) United States Patent
Breit (10) Patent No.: US 6,288,470 B1
(45) Date of Patent: *Sep. 11, 2001

(54) MODULAR MOTOR CONSTRUCTION

(75) Inventor: Stephen M. Breit, Bartlesville, OK (US)

(73) Assignee: Camco International, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,864

(22) Filed: Feb. 11, 1999

(51) Int. Cl.⁷ .................................................... H02K 1/12
(52) U.S. Cl. .............................................................. 310/254
(58) Field of Search ............................... 310/254, 14, 12; 417/416; 166/66.4

(56) References Cited

U.S. PATENT DOCUMENTS

| | | | |
|---|---|---|---|
| 1,840,994 | * 1/1932 | Winsor | 417/417 |
| 2,003,647 | * 6/1935 | Dillstrom | 310/27 |
| 3,548,273 | * 12/1970 | Pardi et al. | 318/135 |
| 4,215,283 | * 7/1980 | Hinds | 310/14 |
| 4,234,831 | * 11/1980 | Kemmer et al. | 310/12 |
| 4,329,122 | * 5/1982 | Owada et al. | 417/365 |
| 4,454,426 | * 6/1984 | Benson | 290/1 R |
| 4,485,126 | 11/1984 | Gaietto et al. | 427/116 |
| 4,548,552 | * 10/1985 | Holm | 417/417 |
| 4,562,385 | * 12/1985 | Rabson | 318/135 |
| 4,578,608 | 3/1986 | Mech et al. | 310/112 |
| 4,631,230 | * 12/1986 | Torossian et al. | 428/412 |
| 4,687,054 | * 8/1987 | Russell et al. | 166/66.4 |
| 4,711,006 | * 12/1987 | Baldenko et al. | 418/5 |
| 4,815,949 | * 3/1989 | Rabson | 417/417 |
| 4,965,864 | * 10/1990 | Roth et al. | 318/135 |
| 5,518,379 | * 5/1996 | Harris et al. | 418/11 |
| 5,620,056 | * 4/1997 | Eppink | 175/95 |
| 5,734,209 | * 3/1998 | Hallidy | 310/12 |
| 5,785,509 | * 6/1998 | Harris et al. | 418/11 |
| 5,831,353 | * 11/1998 | Bolding et al. | 310/12 |

FOREIGN PATENT DOCUMENTS

| | | | |
|---|---|---|---|
| 0 361 925 | 4/1990 | (EP) | H02K/15/03 |
| 0 571 155 | 11/1993 | (EP) | H02K/3/32 |
| 299013 | 5/1929 | (GB) . | |
| 603261 | 6/1948 | (GB) . | |

* cited by examiner

*Primary Examiner*—Nestor Ramirez
*Assistant Examiner*—Joseph Waks
(74) *Attorney, Agent, or Firm*—Fletcher, Yoder & Van Someren (57) ABSTRACT

A modular stator for use in an electric motor. The modular stator includes a plurality of stator sections and a plurality of connectors. The plurality of stator sections have conductors extending therethrough with exposed terminal ends. The connectors have corresponding conductive elements with receptacles for receiving the terminal ends. Thus, a given stator may be assembled to a variety of desired lengths by connecting the appropriate number of modular components.

32 Claims, 6 Drawing Sheets

MODULAR MOTOR CONSTRUCTION

FIELD OF THE INVENTION

The present invention relates generally to electric motors, and particularly to a modular stator assembly that facilitates motor construction.

BACKGROUND OF THE INVENTION

Currently, electric motors, particularly elongate motors such as those used in electrical submergible pumping systems for pumping petroleum, are constructed with unitary stators. Traditionally, individual stator laminations have been stacked together to the full length of the desired stator, and conductive wires have been wound through corresponding openings formed longitudinally through the stator laminations.

Depending on the horsepower required of the motor, electric submergible pumping system motors can utilize stator assemblies thirty feet long or more. Preparation of the stator windings requires long, thin polished rods that serve as needles for pulling the insulated, conductor wires through the lengthy assembly of stator laminations during winding of the motor. This conventional process is a comparatively slow and expensive process for manufacturing such motors. Additionally, repair or rebuilding of such motors often requires complete destruction or tear down of the motor with little component repair value due to the unitary stator assembly.

It would be advantageous to have a modular stator that could be used to construct motors, such as motors utilized in electric submergible pumping systems. Benefits of such a modular construction would include reduced cost and assembly time, reduced repair time and reduced motor component inventory.

SUMMARY OF THE INVENTION

The present invention features a modular stator for use in an electric motor. The stator comprises a plurality of stator sections and a plurality of connectors. The connectors are disposed between sequential stator sections, and the stator sections are selectively coupleable with the plurality of connectors to form stators in a variety of desired lengths.

According to another aspect of the invention, an electric motor is provided that utilizes a modular stator assembly. The electric motor includes an outer housing having a generally hollow interior. A stator is sized to fit within the hollow interior and is formed from a plurality of stator sections. The stator includes at least a first stator section and a second stator section. The first stator section includes a plurality of first stator section conductors extending therethrough. Similarly, the second stator section includes a plurality of second stator section conductors extending therethrough. A connector region is disposed between the first and second stator sections and permits the first and second stator section conductors to be selectively electrically coupled together.

According to another aspect of the invention, a method is provided for facilitating the assembly of an electric motor. The method includes assembling individual stator laminations into a plurality of modular stator sections. Each stator section has a plurality of electrical conductors that may selectively be coupled to each other. The method further includes determining a desired motor length for a given application, and electrically coupling an appropriate number of the modular stator sections to construct the desired motor.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
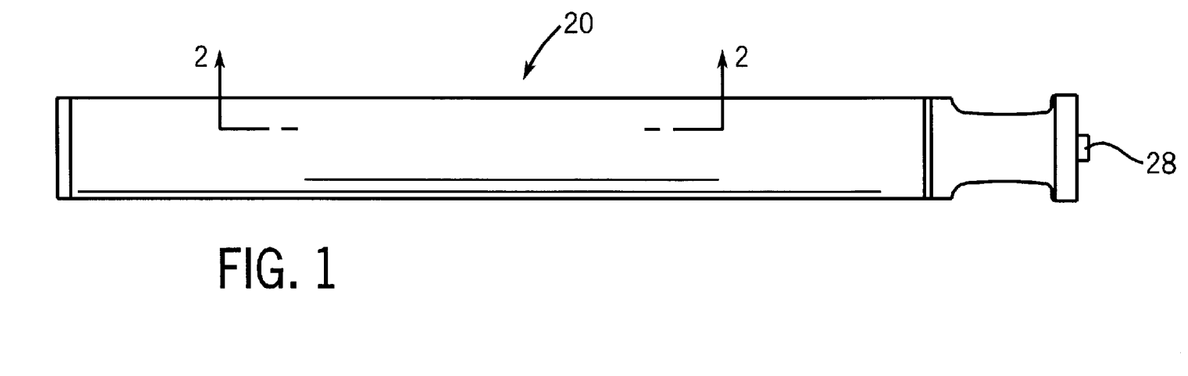
FIG. 1 is a front view of an electric motor, according to a preferred embodiment of the present invention.

Referring generally to FIG. 1, an electric motor 20 is illustrated according to a preferred embodiment of the present invention. Motor 20 is an exemplary motor, such as an elongate, submergible motor that may be connected in a submergible pumping system of the type deployed in a wellbore to pump production fluids, e.g. petroleum. However, the present invention should not be limited to submergible motors.

Figure 2:
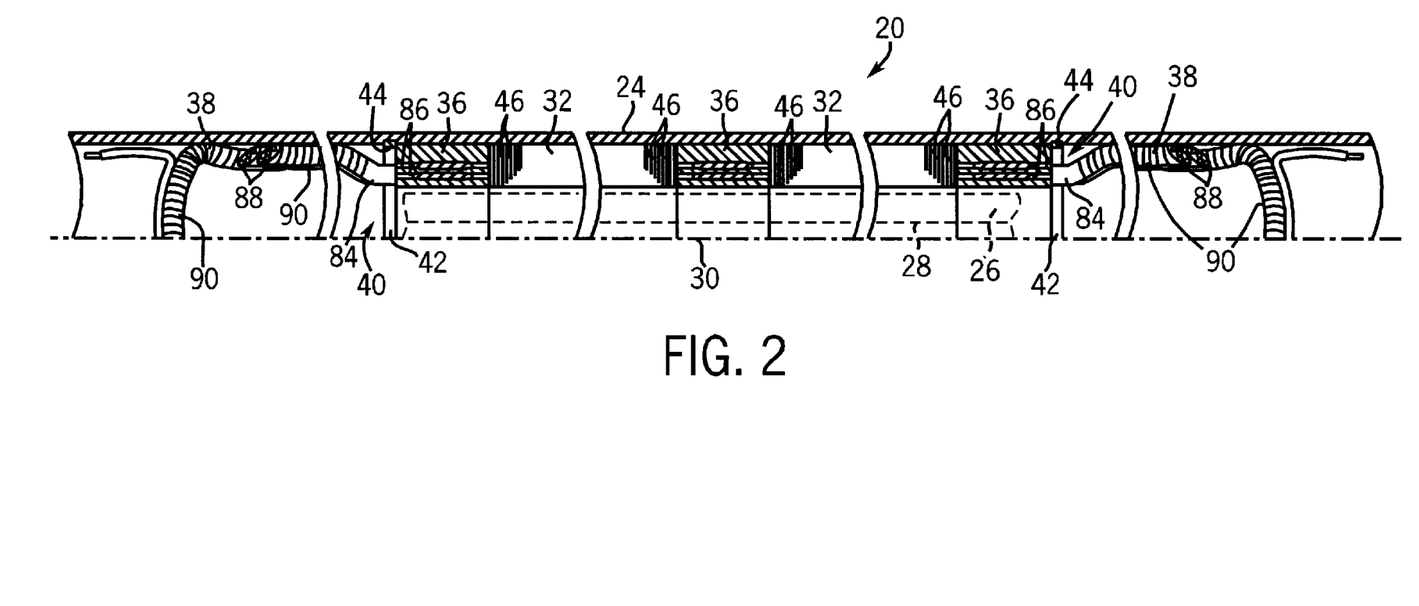
FIG. 2 is a partial cross-sectional view taken generally along line 2—2 of FIG. 1.
Figure 3:
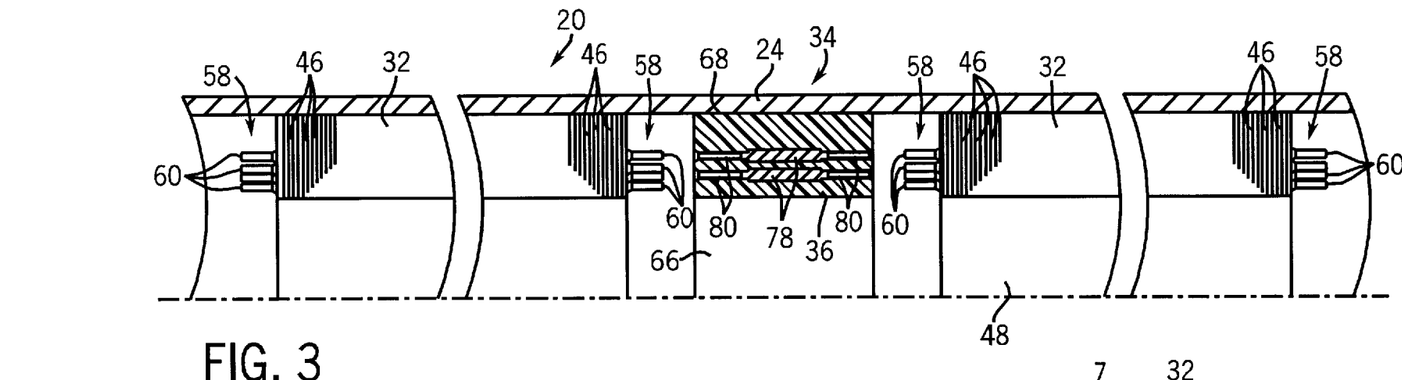
FIG. 3 is a cross-sectional view similar to that of FIG. 2 but showing modular stator components in an exploded view.

Referring also to FIGS. 2 and 3, electric motor 20 generally includes a stator assembly 22 mounted in an outer housing 24. Additionally, a rotor 26 is mounted to a shaft 28 for rotation about an axis 30 within outer housing 24, as is understood by those of ordinary skill in the art.

Stator assembly 22 is a modular assembly including a plurality of stator sections 32 that may be selectively coupled to one another at one or more connection regions 34. Stator assembly 22 typically includes at least two stator sections 32 and often several stator sections 32, depending on the desired length of motor 20. The use of modular stator sections 32 allows the construction of stator assemblies of a variety of lengths simply by selecting the appropriate number of individual sections 32 and electrically coupling them together.

Preferably, each connection region 34 comprises a connector 36 to which adjacent stator sections 32 may be selectively plugged and unplugged. The ability of connectors 36 and adjacent stator sections 32 to be easily connected and disconnected facilitates assembly and disassembly of stator assembly 22 as well as electric motor 20.

Stator assembly 22 further includes a pair of modular end coils 38. End coils 38 may be selectively coupled and uncoupled from the axially outlying stator sections 32 via the axially outlying connectors 36, as illustrated best in FIG. 2. It should be noted that the end coils 38 also can be coupled and uncoupled from a single stator section. The use of a single modular stator section and modular end coils similarly eliminates winding the conductive wires, thereby simplifying construction and repair of the motor.

The various stator sections 32 and connectors 36 may be mounted within outer housing 24 by a variety of methods. In the illustrated embodiment, a retainer 40 abuts each axially outlying connector 36 (see FIG. 2). An exemplary retainer 40 comprises a snap ring 42 disposed in a groove 44 formed in the inside surface or wall of outer housing 24.

Figure 4:
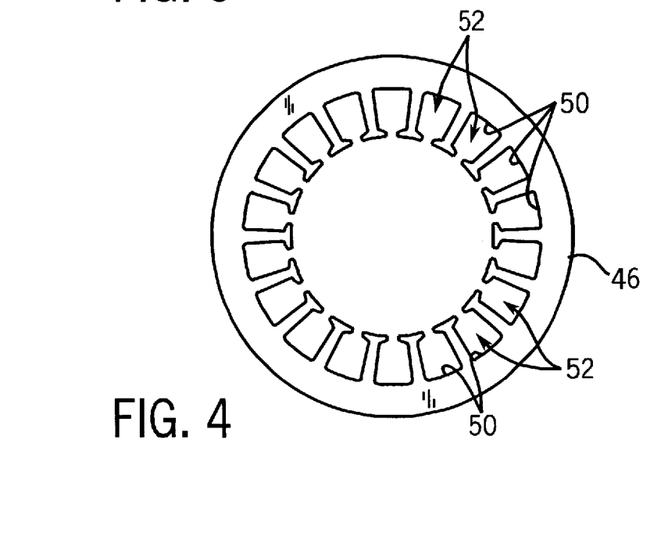
FIG. 4 is an end view of the stacked stator laminations.

As best illustrated in FIG. 3, the preferred stator sections 32 are made from a plurality of metallic laminations 46 that are stacked together, as in conventional stator construction. The laminations 46 have an interior opening 48 into which the rotor 26 and shaft 28 are received when the motor 20 is fully assembled. Additionally, each lamination 46 includes a plurality, e.g. 18, of axial openings 50 that are radially outlying from interior opening 48, as best illustrated in the end view of FIG. 4. As the laminations 46 are stacked together to form a stator section 32, the axial openings 50 are aligned to create longitudinal slots 52 through each stator section 32.

As illustrated in FIGS. 5 through 8, a plurality of conductors 54 are disposed longitudinally through each stator section 32. Preferably, at least two (and more typically eight conductors 54) are disposed through each longitudinal slot 52 (see FIG. 5). As illustrated best in FIG. 6, the individual conductors 54 are insulated from one another and from laminations 46.

Figure 5:
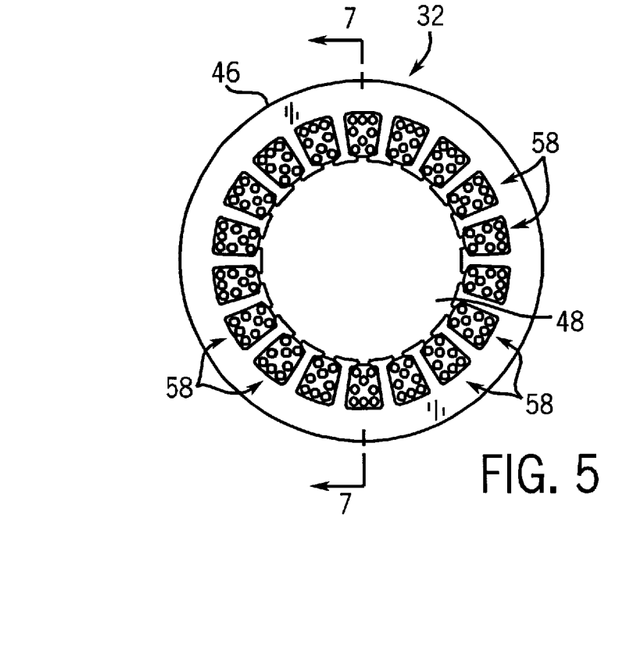
FIG. 5 is a an end view of the completed stator illustrated in FIG. 2.
Figure 6:
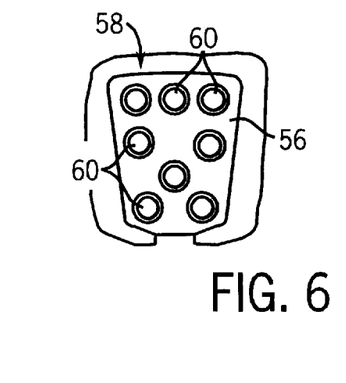
FIG. 6 is an end view of a plurality of conductors mounted in an individual slot of the stator illustrated in FIG. 5.

Because of the unique design of stator sections 32, bare wire conductors, such as copper wires, can be insulated from one another and held in place by an insulator block 56 that may be readily formed from a moldable polymeric material. For example, the individual conductors 54 can be held in proper position and orientation within each longitudinal slot 52 while a moldable polymeric material is injected into each longitudinal slot 52 and allowed to solidify. Exemplary insulating materials include polyetheretherketone (PEEK), kapton, and mylar. Once the moldable material sets, the bare wire conductors 54 are securely held in place within their corresponding longitudinal slots 52.

Figure 7:
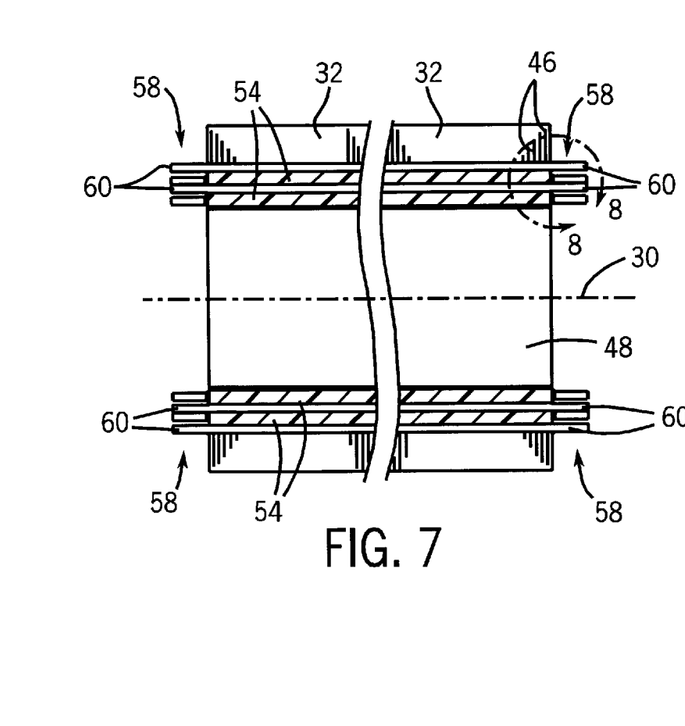
FIG. 7 is a cross-sectional view taken generally along line 7—7 of FIG. 5.
Figure 8:
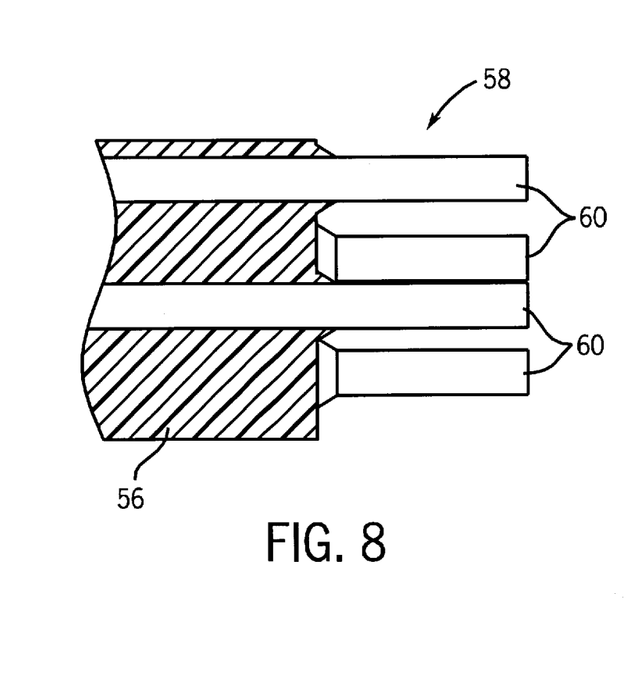
FIG. 8 is an enlarged cross-sectional view taken generally along line 8—8 of FIG. 7.

Individual stator sections 32 may be coupled together in a variety of ways at the various connection regions 34 disposed between adjacent stator sections 32. However, in the preferred embodiment, each stator section 32 is formed with a plug connection 58 disposed at each of its longitudinal ends, as best illustrated in FIGS. 7 and 8.

In the embodiment illustrated, each plug connection 58 includes a plurality of protrusions or terminal ends 60 that are electrically coupled to conductors 54. Protrusions 60 may comprise the protruding ends of the wires or conductive elements used to form conductors 54.

Connectors 36 are constructed for engagement with plug connection ends 58 of adjacent stator sections 32. Connectors 36 may be formed as part of one or more of the adjacent stator sections 32 or as independent connectors. With reference to FIGS. 9–12, a preferred, exemplary embodiment of an independent connector 36 can be described.

Figure 9:
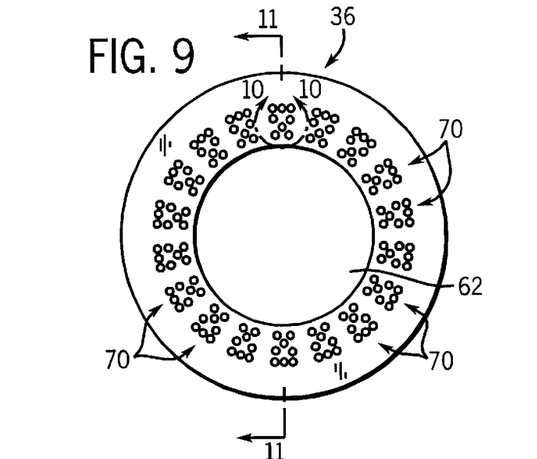
FIG. 9 is an end view of a connector disposed between stator sections.

Generally, each connector 36 is circular in shape and includes a central opening 62 that is aligned with the interior openings 48 of stator sections 32. In other words, each connector 36 is generally "donut-shaped," having a pair of axial side walls 64, an interior wall or surface 66 and an exterior wall or surface 68. Exterior wall 68 has a radius that permits the connector 36 to be slid into outer housing 24 of motor 20 adjacent the interior surface of outer housing 24.

Figure 10:
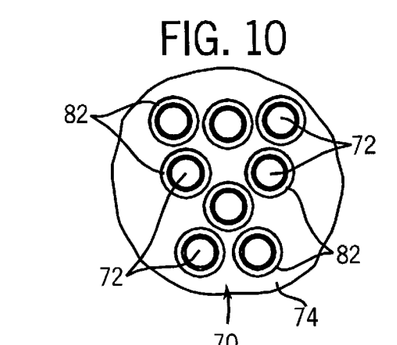
FIG. 10 is an enlarged view taken generally along line 10—10 of FIG. 9.

As illustrated best in FIG. 9 and the enlarged view of FIG. 10, each exemplary connector 36 includes a plurality of plug connectors 70 disposed along each of its axial sidewalls 64. Plug connectors 70 are arranged for engagement with the plug connectors 58 of adjacent stator sections 32. In the illustrated embodiment, each plug connector 70 includes a plurality of recesses 72 arranged and sized to receive protrusions 60 of a corresponding stator section plug connector 58. Thus, adjacent stator sections can be electrically coupled together via an appropriate connector 36 disposed therebetween, as illustrated in FIG. 3.

Figure 11:
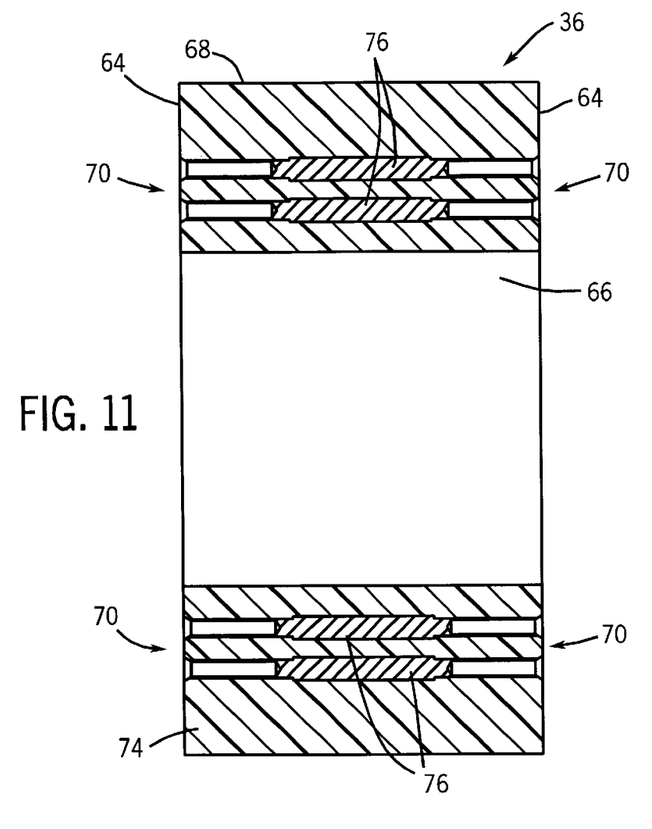
FIG. 11 is a cross-sectional view taken generally along line 11—11 of FIG. 9.
Figure 12:
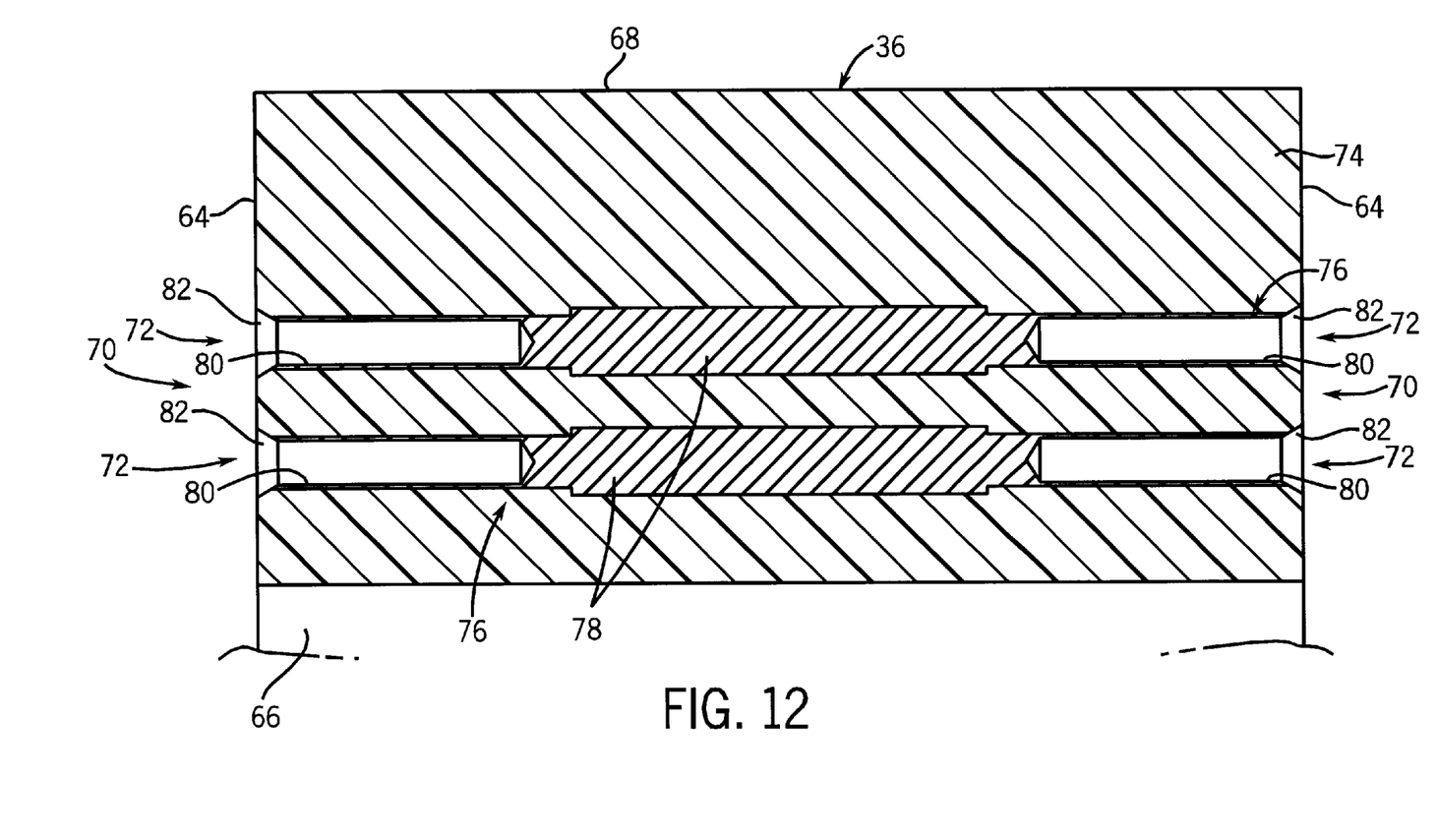
FIG. 12 is an enlarged view of the upper portion of the illustration in FIG. 11.

In the preferred embodiment, each connector 36 comprises a connector block 74 formed of an insulative material, such as a polymeric material. Exemplary insulation materials include PEEK, kapton, and mylar. Within each connector block 74, a plurality of conductive elements 76 are arranged in a generally axial direction, as best illustrated in FIGS. 11 and 12.

Conductive elements 76 may be made of copper or other appropriate, conductive materials to form conductive paths from one stator section 32 to another. The conductive elements 76 are arranged to be contacted by protrusions 60 when adjacent stator sections 32 are coupled to a given connector 36. For example, each conductive element may include a central solid body 78 (see FIG. 12) having a socket 80 disposed at each axial end. Sockets 80 are sized to matingly receive protrusions 60 to form a conductive path.

Preferably, each socket 80 extends to a chamfered opening 82 formed in the axial side wall 64 at each conductive element 76. Chamfered openings 82 facilitate the insertion of protrusions 60 when stator sections 32 and connectors 36 are assembled.

Furthermore, end coils 38 preferably include ends 84 designed for coupling with a stator section 32. Ends 84 may be in the form of plug ends having a plurality of plug protrusions 86 (see FIG. 2) arranged for insertion into a corresponding plug connector 70 of the axially outlying connector 36 at each end of stator assembly 22. The protrusions 86 form a conductive path with a plurality of corresponding conductive wires 88. Generally, the wires 88 (for each plug connector 70) are wrapped by an insulating material, such as a tape 90. Thus, each cluster of wrapped conductive wires 88 has a pair of plug connectors 84 that may be selectively plugged into the appropriate stator section via, for instance, the plug connectors 70 of each axially outlying connector 36. Connection of the end coils completes the windings of stator assembly 22. A continuous conductive path is formed between each stator section 32 via the intermediate connectors 36 and the end coils 38.

During assembly, the modular components, e.g. connectors 36, stator sections 32 and end coils 38, can be preassembled and slid into outer housing 24 as a unit. Alternatively, the individual components can be assembled as they are moved into outer housing 24. Furthermore, the number of stator sections 32 and connectors 36 can be selected according to the desired length/horsepower for a given motor, provided the outer housing 24 is of an appropriate length to accommodate the selected number of modular components.

In the event of repair or servicing, the stator assembly 22 simply can be removed from outer housing 24 and uncoupled as necessary. For example, if a certain stator section 32 requires replacement, the surrounding components can be uncoupled, e.g. unplugged, and a replacement stator section 32 inserted. This modular concept greatly simplifies the assembly, servicing, repair, and stocking of replacement stator components for electric motor 20.

Figure 13:
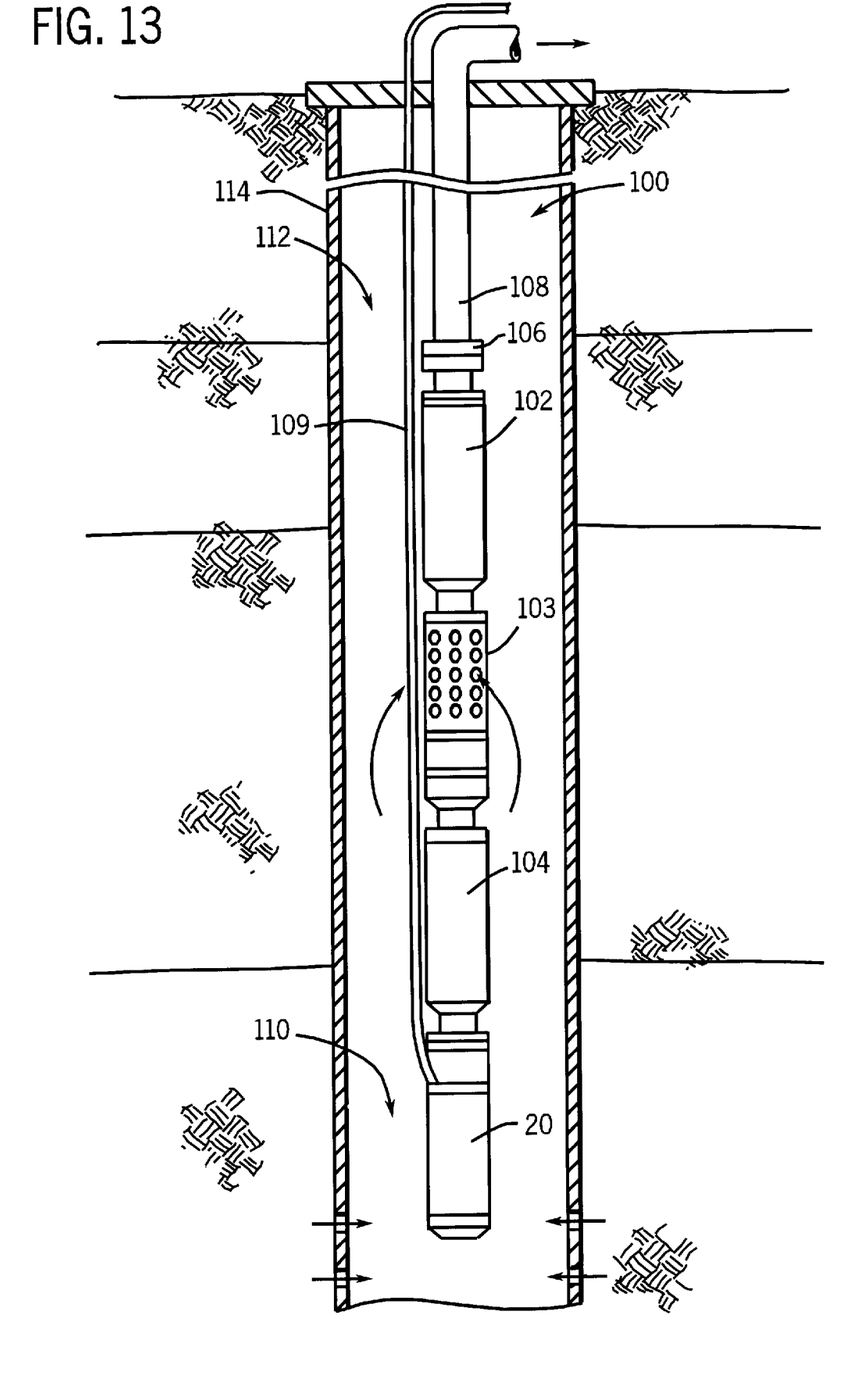
FIG. 13 is a front elevational view of a submergible pumping system positioned in a wellbore and utilizing an electric motor of the type illustrated in FIG. 1.

Referring generally to FIG. 13, an exemplary use of motor 20 is illustrated. In this particular utilization, motor 20 is connected as an integral component in a submergible pumping system 100. Submergible pumping system 100 may comprise a variety of components depending on the particular application or environment in which it is used. However, system 100 typically includes a submergible motor, such as motor 20, that drives a submergible pump 102 having a pump intake 103.

Additionally, a motor protector 104 is connected between submergible pump 102 and motor 20 to isolate well fluid from internal motor oil within motor 20. A connector 106 is used to connect the submergible pumping system to a deployment system 108, e.g. production tubing, cable or coil tubing. Power is supplied to electric motor 20 by a power cable 109.

Submergible pumping system 100 is designed for deployment in a well 110 containing desirable production fluids, such as petroleum. In a typical application, a wellbore 112 is drilled and lined with a wellbore casing 114. System 100 is deployed within wellbore 112 to a desired location for pumping of the wellbore fluids.

Because of the relatively small diameter and space constraints in a wellbore environment, elongate motors, often thirty feet in length or more, are used. The above-described modular approach to motor construction facilitates the assembly, servicing, repair and storage of replacement components for such motors.

It will be understood that the foregoing description is of a preferred embodiment of this invention, and that the invention is not limited to the specific form shown. For example, a variety of connection regions can be used to couple individual stator sections to one another; a variety of component shapes and sizes may be utilized; different motor styles and types may benefit from the modular construction described above; other components may be combined with the modular stator sections; single modular stator sections can be utilized with modular end coils; various plug configurations and coupling structures can be used to combine components; and the subject motor may be utilized in a variety of systems and environments. These and other modifications may be made in the design and arrangement of the elements without departing from the scope of the invention as expressed in the appended claims.

What is claimed is:

1. A rotary electric motor, comprising:
   a rotor configured for rotation about an axis;
   a plurality of stator sections having a plurality of conductors extending longitudinally through a substantial portion of the plurality of stator sections; and
   a plurality of connector regions, wherein the plurality of connector regions permit the plurality of stator sections to be electrically plugged together to form a stator of a desired length.

2. The modular stator as recited in claim 1, wherein each of the stator sections comprises a plurality of laminations.

3. The modular stator as recited in claim 2, wherein each of the stator sections includes a plurality of longitudinal slots.

4. The modular stator as recited in claim 3, wherein each of the stator sections includes a plurality of conductors extending along each longitudinal slot and terminating at a plurality of corresponding protrusions.

5. The modular stator as recited in claim 4, wherein each of the connector regions includes an independent connector having a plurality of conductive elements insulated from one another, further wherein each of the conductive elements is designed for engagement with one of the corresponding protrusions when the plurality of stator sections and the plurality of connector regions are assembled.

6. The modular stator as recited in claim 5, wherein the plurality of conductors are molded in a polymeric material.

7. The modular stator as recited in claim 6, wherein each conductive element includes a hollow receptacle at each end, each hollow receptacle being sized to received a corresponding protrusion.

8. A rotary electric motor, comprising:
   an outer housing having a generally hollow interior; and
   a generally hollow stator sized to fit in the generally hollow interior of the outer housing, the stator having a plurality of stator sections including:
      a first stator section, having a plurality of first stator section conductors extending longitudinally through a substantial portion of the first stator section and terminating at a first plug connector; and
      a second stator section, having a plurality of second stator section conductors extending longitudinally through a substantial portion of the second stator section and terminating at a second plug connector, wherein the first plug connector is plugged into the second plug connector to form an electrical connection between the first and the second stator section conductors; and
   a rotor sized to fit within the generally hollow stator.

9. The electric motor as recited in claim 8, further comprising a connector unit into which the first and the second stator section conductors may be plugged to form conductive connection at the connector region.

10. The electric motor as recited in claim 9, wherein the connector unit includes a plurality of receptacles and the first and second stator section conductors include corresponding connector ends sized for insertion into the plurality of receptacles.

11. The electric motor as recited in claim 8, wherein the first stator section includes a plurality of first longitudinal slots through which the first stator section conductors extend and the second stator section includes a plurality of second longitudinal slots through which the second stator section conductors extend.

12. The electric motor as recited in claim 11, wherein each first longitudinal slot of the plurality of first longitudinal slots is at least partially filled with a moldable polymeric material that insulates the first stator section conductors from one another in each first longitudinal slot.

13. The electric motor as recited in claim 12, wherein each second longitudinal slot of the plurality of second longitudinal slots is at least partially filled with a moldable polymeric material that insulates the second stator section conductors from one another in each second longitudinal slot.

14. The electric motor as recited in claim 13, wherein the moldable polymeric material comprises a PEEK material.

15. The electric motor as recited in claim 8, further comprising an end coil having a plugable end that may be plugged into electrical communication with at least one of the first and second stator sections.

16. A method for facilitating the assembly of an electric motor, comprising:
   assembling individual stator laminations into a plurality of modular stator sections that each have a plurality of electrical conductors extending longitudinally therethrough;

determining a desired motor length for a given application; and electrically coupling an appropriate number of the plurality of modular stator sections according to the desired motor length.

17. The method as recited in claim 16, further comprising forming a plurality of longitudinal slots through each stator section; and disposing at least two electric conductors through each longitudinal slot.

18. The method as recited in claim 17, further comprising molding a polymeric material in each longitudinal slot to hold the at least two electric conductors.

19. The method as recited in claim 16, further comprising forming connectors having opposing plug regions into which a pair of sequential, modular stator sections may be plugged to form an electrical connection therebetween.

20. The method as recited in claim 19, wherein forming includes disposing at least two conductive elements in a polymeric insulating material; and orienting the at least two conductive elements to extend between the opposing plug regions for engagement with the at least two electric conductors of corresponding modular stator sections.

21. A modular motor construction, comprising:

a plurality of modular stator sections having a plurality of conductors extending generally longitudinally therethrough;

a plurality of connector regions configured for coupling the plurality of conductors to form a plurality of continuous conductive paths extending longitudinally through the modular motor;

at least one end coil that may be selectively coupled into electrical communication with the plurality of conductors to couple a first continuous conductive path extending longitudinally through the modular motor to a second continuous conductive path extending longitudinally through the modular motor; and a rotor disposed in the plurality of modular stator sections for rotation about a rotor axis.

22. The modular motor construction as recited in claim 21, wherein the at least one end coil includes a pair of end coils that each may be selectively coupled into electrical communication with the plurality of conductors.

23. The modular motor construction as recited in claim 22, wherein each end coil includes a plug end that may be plugged into communication with the modular stator section at a connection region.

24. The modular motor construction as recited in claim 23, wherein the connection region includes an independent connector that may be engaged and disengaged from the modular stator section and the at least one end coil.

25. The modular motor construction as recited in claim 24, further comprising a second modular stator section electrically coupleable to the modular stator section.

26. A rotary electric motor, comprising:

a rotor held in a single axial location and configured for rotation about an axis;

a plurality of stator sections having a plurality of conductors extending longitudinally through a substantial portion of the plurality of stator sections; and a plurality of connector regions configured for coupling the stator sections to form a stator assembly of a desired length, and configured for electrically coupling the conductors to form at least one continuous conductive path extending longitudinally through the stator assembly.

27. The rotary electric motor as recited in claim 26, wherein each stator section comprises a plurality of laminations.

28. The rotary electric motor as recited in claim 27, wherein each stator section includes a plurality of axial slots.

29. The rotary electric motor as recited in claim 28, wherein each stator section includes a plurality of conductors extending along each axial slot and terminating at a plurality of corresponding protrusions.

30. The rotary electric motor as recited in claim 29, wherein each connector region includes an independent connector having a plurality of conductive elements insulated from one another, further wherein each conductive element is designed for engagement with one of the corresponding protrusions when the plurality of stator sections and the plurality of independent connectors are assembled.

31. The rotary electric motor as recited in claim 30, wherein the plurality of conductors are molded in a polymeric material.

32. The rotary electric motor as recited in claim 31, wherein each conductive element includes a hollow receptacle at each end, each hollow receptacle being sized to received a corresponding protrusion.

* * * * *